E. SCHNEIDER.
BRAKE FOR GUNS.
APPLICATION FILED MAR. 31, 1919.
1,346,560.
Patented July 13, 1920.
6 SHEETS—SHEET 1.
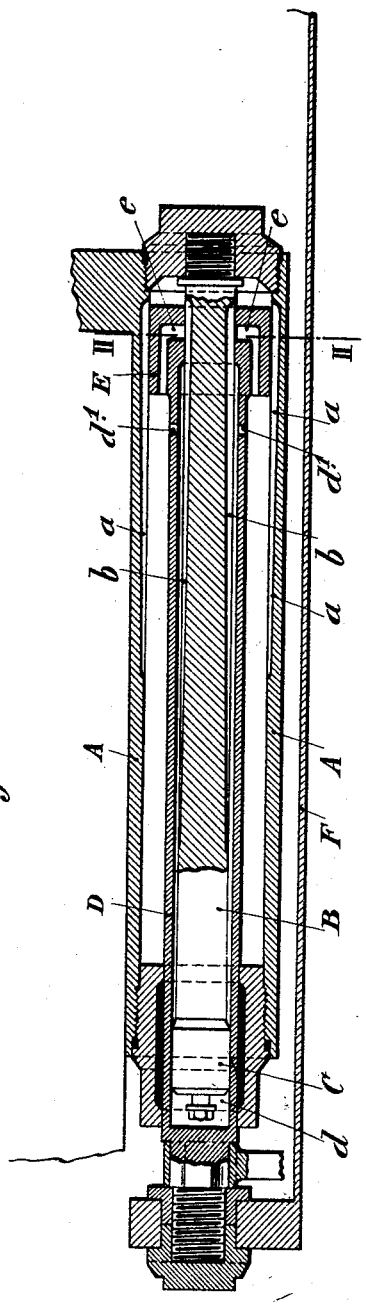
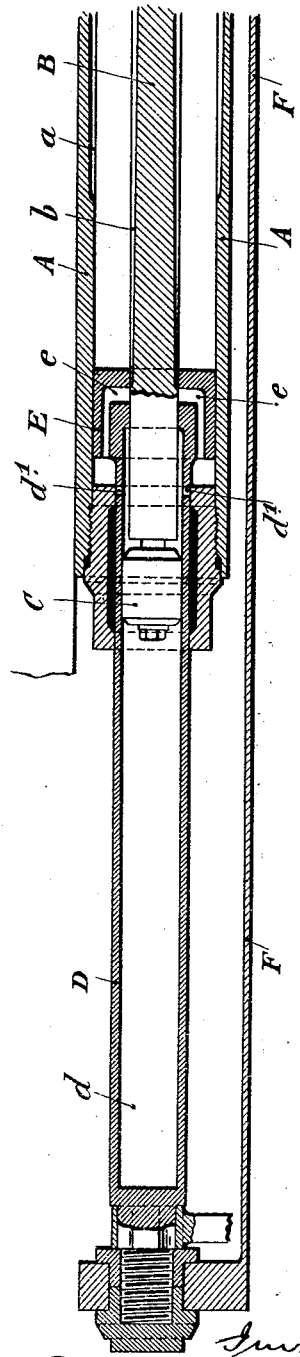

E. SCHNEIDER.
BRAKE FOR GUNS.
APPLICATION FILED MAR. 31, 1919.

1,346,560.

Patented July 13, 1920.
6 SHEETS—SHEET 2.

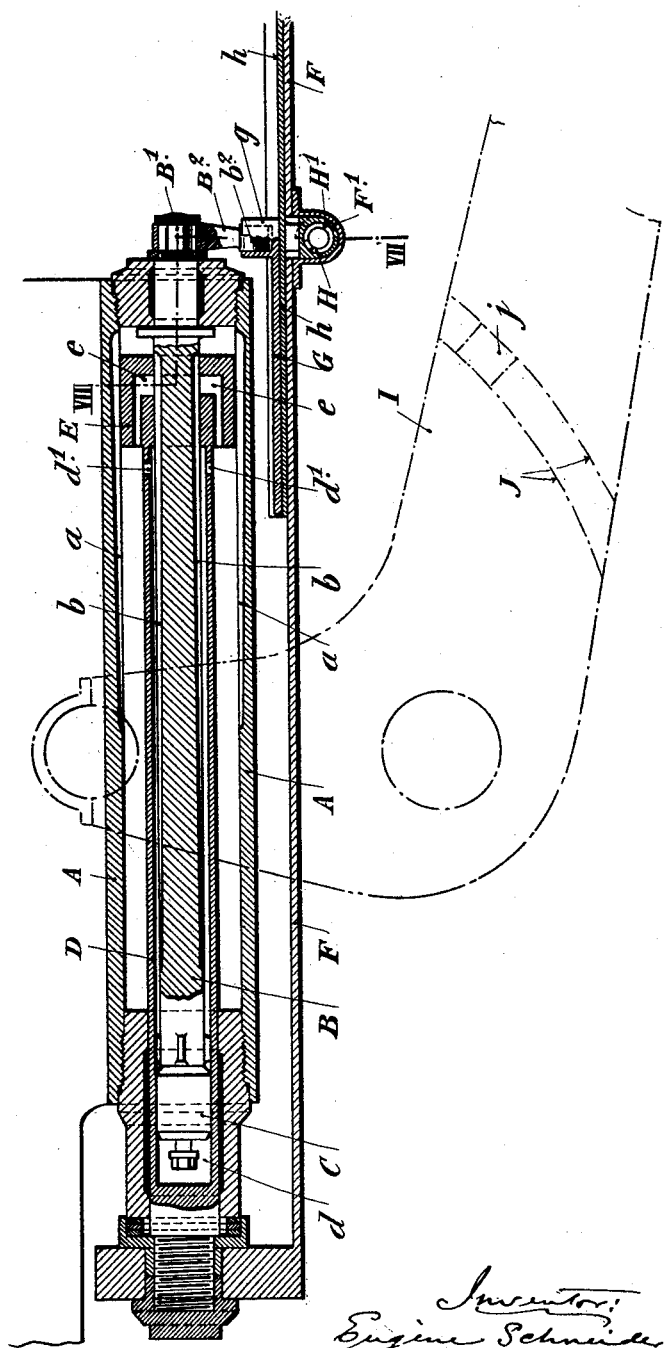

E. SCHNEIDER.
BRAKE FOR GUNS.
APPLICATION FILED MAR. 31, 1919.

1,346,560.

Patented July 13, 1920.
6 SHEETS—SHEET 4.

E. SCHNEIDER.
BRAKE FOR GUNS.
APPLICATION FILED MAR. 31, 1919.

1,346,560.

Patented July 13, 1920.
6 SHEETS—SHEET 5.

E. SCHNEIDER.
BRAKE FOR GUNS.
APPLICATION FILED MAR. 31, 1919.

1,346,560. Patented July 13, 1920.
6 SHEETS—SHEET 6.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

BRAKE FOR GUNS.

1,346,560.  Specification of Letters Patent.  Patented July 13, 1920.

Application filed March 31, 1919. Serial No. 286,496.

*To all whom it may concern:*

Be it known that I, EUGÈNE SCHNEIDER, citizen of the French Republic, and a resident of 42 Rue d'Anjou, Paris, France, have invented a new and useful Improved Brake for Guns, which invention is fully set forth in the following specification.

This invention has for its object to provide an improved hydraulic brake for guns, comprising in the known manner a brake cylinder which is fixed to the recoiling part or to the non-recoiling part of the gun, and which has attached to its rear end a counter-rod fitted at its free end with a valve for a running-out moderator. This counter-rod works in a brake piston whose rod is fixed on the contrary to the non-recoiling or the recoiling part of the gun, as the case may be.

The improved brake of that known type, is characterized by the feature that, normally, the throttling of the flow of the liquid during the recoil, is effected on one hand between the external surface of the piston and the shaped grooves of reduced length formed in the wall of the cylinder and on the other hand between the inner internal surface of the piston and the shaped grooves in the counter-rod of the running-out moderator. These latter grooves communicate with the chamber of the cylinder through passages formed in the piston. The flow between the grooves of the counter-rod and the internal surface of the piston may be diminished or stopped altogether by a partial or a total closing of the communication passages between these grooves and the chamber of the brake cylinder. This closing is effected by a relative angular movement between the counter-rod and the piston.

Various constructional forms and applications of the improved brake are illustrated by way of example in the accompanying drawings in which:—

Figures 1 to 5 illustrate a first constructional form.

Fig. 1 is a longitudinal section of the improved brake on the line I—I of Fig. 2.

Fig. 2 is a cross section on the line II—II of Fig. 1. In these two figures, the parts of the brake are shown in the position they occupy when the gun barrel is run-out; the brake being regulated for the maximum recoil.

Fig. 3 is a section similar to Fig. 1, the parts being shown in the positions they occupy at the end of the recoil.

Fig. 4 is a section similar to Fig. 2, the parts of the brake being regulated with the object of reducing the recoil as much as possible, and Fig. 5 is a longitudinal section on the line V—V of Fig. 4, the parts being shown in the positions they occupy at the end of the recoil.

Fig. 6 is a longitudinal section on the line VI—VI of Fig. 7, showing a modification of the invention.

Referring more particularly to Figs. 1 to 5, A is a brake cylinder carried by the recoiling part (gun barrel or slide) of the gun; to its rear end is fixed a counter-rod B fitted at its free end with a valve C for constituting the known running-out moderator. The chamber $d$ of this moderator is formed by the internal cavity of the piston brake rod D. This rod is carried by a non-recoiling part such as the gun cradle F. The inside wall of cylinder A is formed along a short length, with shaped grooves $a$ arranged diametrally opposite one another. The cross section of these grooves diminishes from back to front. The counter-rod B is formed with longer grooves $b$ whose cross section likewise diminishes from back to front of the gun.

The piston E is formed with passages $e$. A relative angular displacement between the piston E and the counter-rod B is produced in this first example by rotation of the rod D. This rotation may be produced by any suitable mechanism operable by hand or dependent upon the elevating mechanism of the gun barrel.

Figure 2:
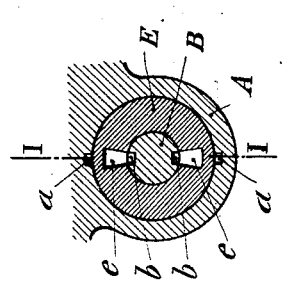
Figure 5:
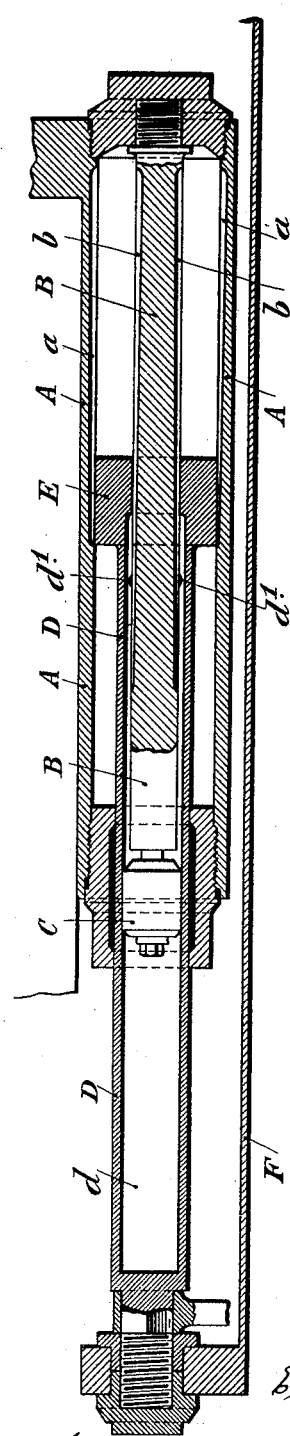

When the parts are in the positions shown in Figs. 1 and 2, the brake is so regulated that the piston rod D occupies relatively to the counter-rod B, a position such that the communication passages between the rear face of the piston E and the grooves $b$ shall be entirely uncovered.

At the recoil, the liquid is able to flow through the grooves $a$ between the inside wall of cylinder A and the outside wall of piston E; it will also flow through the passage $e$ and the grooves $b$ from the rear side to the front side of piston E.

Figure 4:
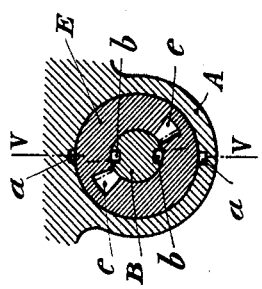

If the piston rod D is shifted relatively to the counter-rod B, in such a manner as to bring it into the position shown in Fig. 4, the full portions of piston E will come opposite grooves $b$. In other words there will no longer be any communication between these grooves $b$ and the brake cylinder through the passages $e$. $d^1$ are communication orifices formed in the side of the piston rod D to allow the liquid in the brake cylinder chamber to flow without being throttled, into the chamber $d$ of the running-out moderator, for which purpose the liquid will force open the valve C in the usual manner.

The communication passages $e$ may be only partly uncovered by rotating the piston rod D through a smaller angle, so as to bring the passages $e$ for instance into the position indicated by dash-dot lines in Fig. 4. The braking will be effected under those conditions by means of the liquid flowing both through the grooves $a$ and the grooves $b$; the cross section of flow through the latter grooves being however diminished by a greater extent than for the full-distance recoil (Fig. 2) at which the said section is wholly uncovered. By this means a length of recoil is obtained intermediate between the maximum and minimum recoils.

Figure 7:
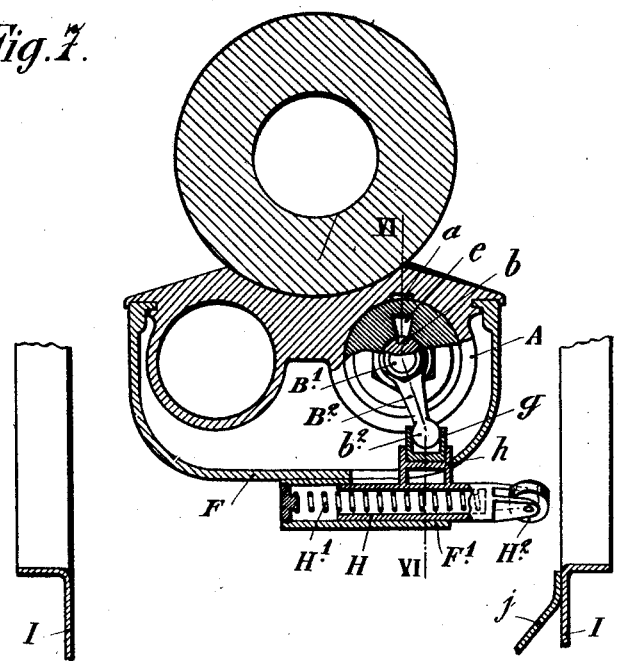
Fig. 7 is a cross section on the line VII—VII of Fig. 6. In these two figures the parts of the brake are shown regulated for the maximum recoil, and in the positions they occupy when the gun barrel is run out.
Figure 8:
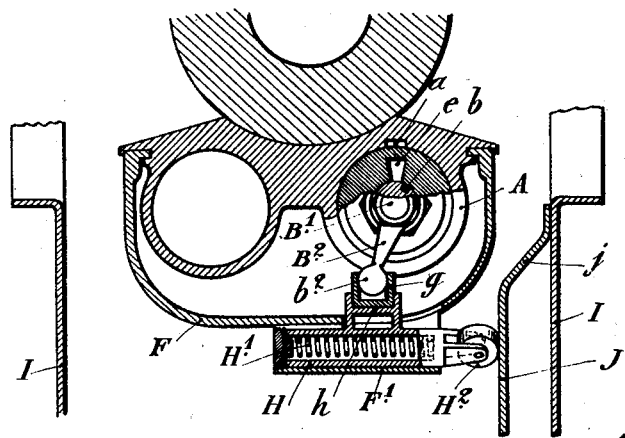
Fig. 8 is a cross section similar to Fig. 7; the brake parts being shown in the positions they occupy automatically by reason of the elevation given to the combined gun cradle and gun barrel.
Figure 9:
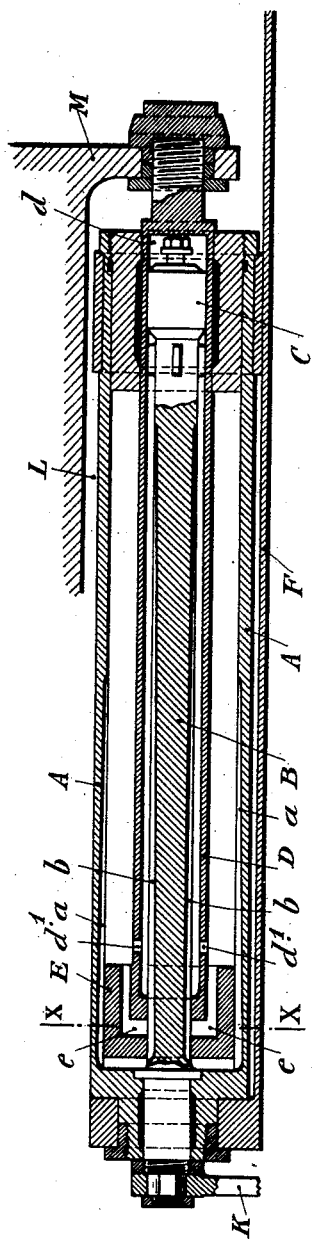
Fig. 9 is a longitudinal section on the line IX—IX of Fig. 10, showing a second modification of the invention.
Figure 11:
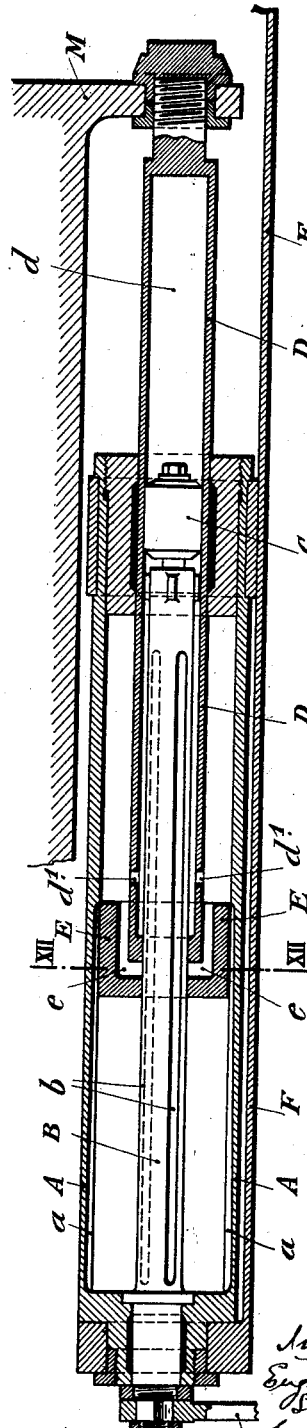
Fig. 11 is a longitudinal section on the line XI—XI of Fig. 12.
Figure 10:
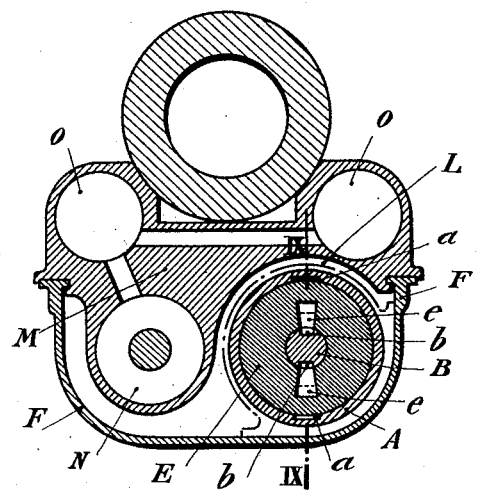
Fig. 10 is a cross section on the line X—X of Fig. 9. In these figures the parts are shown adjusted for the maximum recoil and in the positions they occupy when the gun barrel is run-out for firing.
Figure 12:
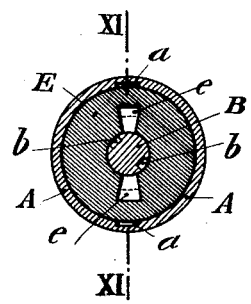
Fig. 12 is a cross section on the line XII—XII of Fig. 11. In these figures the parts are shown adjusted for the minimum recoil and in the positions they occupy at the end of the recoil.

Figs. 6, 7 and 8 illustrate a modification wherein the relative angular displacement between the counter-rod B and the piston E is produced by a rotation of the said counter-rod produced automatically by the elevation of the gun cradle.

The relative angular displacements between the counter-rod B carried by the rear end of the cylinder A and the piston E are produced as follows:—

On an external extension $B^1$ of the counter-rod B there is fixed a tappet $B^2$ that is engaged by means of a cylindrical head $b^2$ in a "hold box" $g$ formed on the end of a sliding carriage G moving in a guideway $h$ which is itself formed on a slider H working in a guide $F^1$ provided transversely underneath the gun cradle F. This slider H carries externally a roller $H^2$. $H^1$ is a spring having a constant tendency to push the slider H and consequently the roller $H^2$ in the outward direction.

At the recoil the head $b^2$ of the tappet $B^2$ remains in the box $g$ and therefore moves the carriage G along in the guideway $h$, irrespectively of the position of the latter relatively to the axis of the gun barrel. The carriage G remains bearing upon the bottom of the guideway $h$, even during the maximum recoil.

Whenever the gun barrel is inclined at an angle such that the roller $H^2$ will become engaged between the side plates I of the gun carriage, the said roller will encounter a guide J formed on one of the side plates I and centered in the axis of the gun cradle trunnions. This guide, which is reached by the slider H by way of an incline $j$, pushes the said slider outward and thereby moves the box $g$ and through the latter, the head $b^2$ (Fig. 8). The tappet $B^2$ is thus compelled to rotate and bring the grooves $b$ of the counter-rod opposite a full part of the piston E. In other words, communication is interrupted between these grooves $b$ and the passages $e$.

The angular movements of the counter-rod B are effected with an extremely small effort, owing to the small diameter of this counter-rod and the very slight friction on the joint between it and the rear end of the cylinder A; this joint, by the way, not being under pressure. In this respect this construction has a great advantage over those shown in Figs. 1 to 5 where the rotation of the piston rod inside the joint under pressure requires a much greater effort.

When the gun barrel is brought into a position of lower elevation exactly at the moment when the roller $H^2$ has quit the guide J, the parts will resume automatically the positions shown in Fig. 7. The spring $H^1$ expanding, causes the tappet $B^2$ to turn back and thus bring the grooves $b$ again into communication with the passages $e$.

Figs. 9 to 12 illustrate a modification wherein the brake cylinder is attached to the non-recoiling part of the gun, the brake piston being fixed to the recoiling part.

In this example the brake cylinder A is attached to the gun cradle F; it carries at its forward end a counter-rod and piston B—C.

The rod D of the brake piston E is fixed to the recoiling part. The relative angular movements between the counter-rod B and the piston E are produced in this example by rotation of the counter-rod B which is suitably extended to the outside for the reception of a suitable actuating device such as a lever K. The brake cylinder A may be mounted in the gun cradle F; a suitable recess L (Fig. 10) being formed in the mass M in which the recuperator cylinder N and the reservoirs O are formed. Preferably a free space is left between the cylinder A and the mass M for the purpose of promoting a flow of air around the said cylinder A.

What I claim is:—

1. In brake apparatus for guns, the combination of a brake cylinder having in its wall tapering throttling grooves of comparatively short length, a valved counter-rod fast at one end of the brake cylinder and having tapering throttle grooves of greater length than the grooves in the brake cylinder wall, a piston cylinder entering the brake cylinder and open to the same and receiving the counter-rod, said piston cylinder and counter-rod being angularly movable in respect to each other, and a piston head on the piston cylinder to throttle the flow of fluid through the grooves of both the brake cylinder wall and the counter-rod, the latter extending through the piston head, the piston head having passages continuously open at one end to the brake cylinder space on one side of the piston head and the other end of said passages positioned to register more or less with the grooves of the counter-rod or closed altogether by relatively angular displacement of the counter-rod and the piston cylinder, the grooves of the counter-rod and the passages through the piston head constituting a conduit for the flow of the fluid from one side of the piston head to the other side separate from the grooves in the brake cylinder wall, the controlled flow of the fluid through said conduit operating to regulate the recoil of the gun.

2. In brake apparatus as defined in claim 1 wherein said brake cylinder and counter-rod are fast to a recoiling part of the gun, and means controlled by the elevation of the gun for determining the length of recoil comprising: a tappet carried by the counter-rod, a cam operated carriage on the gun cradle yieldingly held against movement transverse the recoiling path of said tappet and a slidable member supported by said carriage and having a loose connection with said tappet.

In testimony whereof I have signed this specification.

EUGÈNE SCHNEIDER.